UNITED STATES PATENT OFFICE.

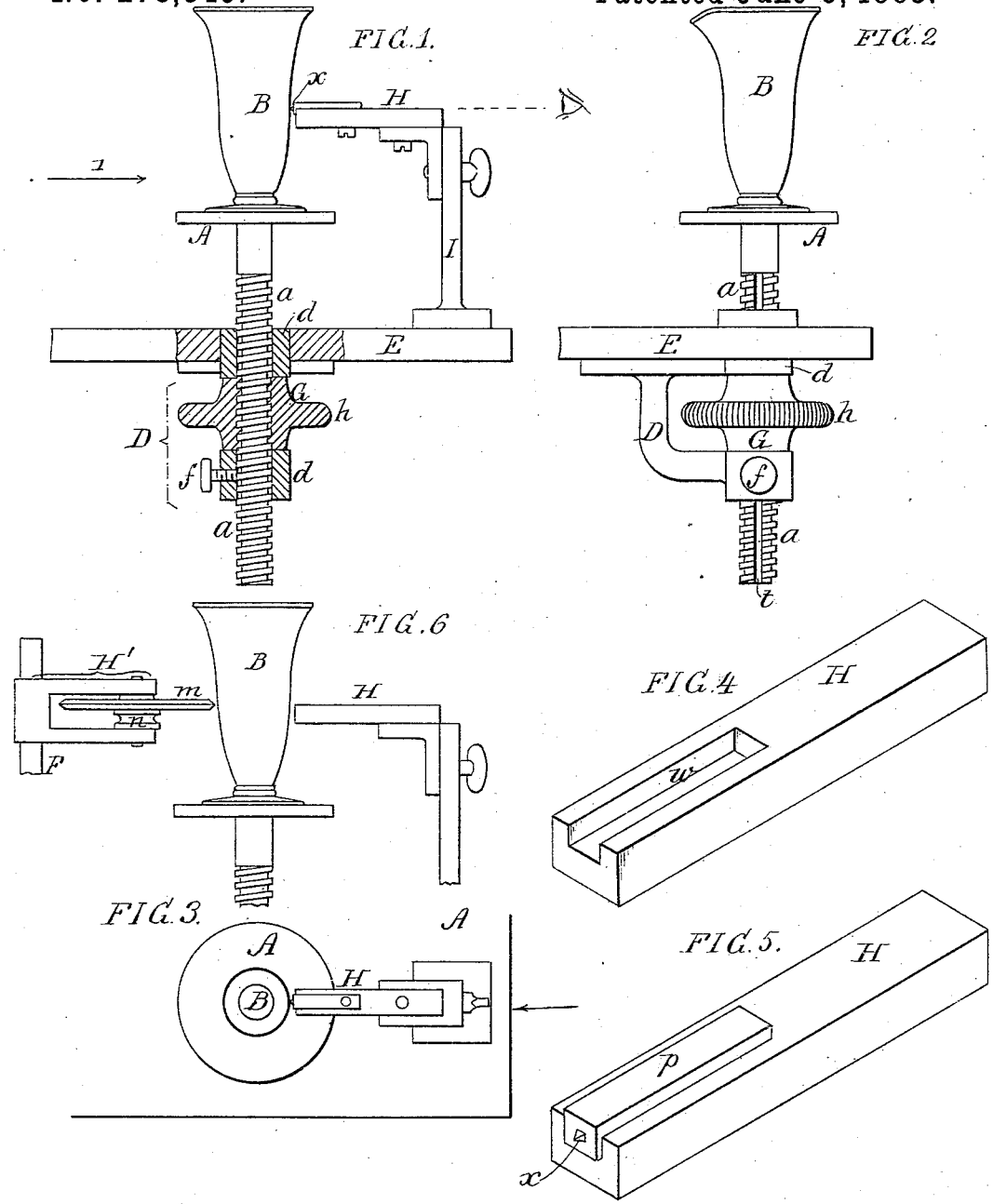

RICHARD M. ATWATER, OF MILLVILLE, NEW JERSEY, ASSIGNOR OF ONE-HALF TO WHITALL, TATUM & CO., OF PHILADELPHIA, PA.

APPARATUS FOR DETERMINING THE SCALE OF GLASS MEASURING-VESSELS.

SPECIFICATION forming part of Letters Patent No. 278,845, dated June 5, 1883.

Application filed February 5, 1883. (No model.)

*To all whom it may concern:*

Be it known that I, RICHARD M. ATWATER, a citizen of the United States, and a resident of Millville, Cumberland county, New Jersey, have invented certain Improvements in Apparatus for Determining the Scales of Glass Measuring-Vessels, of which the following is a specification.

My invention consists of apparatus, fully described hereinafter, for accurately determining the graduation-marks on glass measuring-vessels.

In the accompanying drawings, Figure 1 is a vertical section of the apparatus; Fig. 2, an elevation looking in the direction of the arrow, Fig. 1; Fig. 3, a plan view; Figs. 4 and 5, perspective views, full size, of the sighting-bar, showing the plan which I prefer of fixing the marking-diamond to the said bar; and Fig. 6, a view illustrating a modification of my invention.

A is a vertically-adjustable platform, on which is placed the glass measure B to be marked, the platform having a true face, which must always be in a horizontal plane. For the ready and accurate vertical adjustment of this platform, I prefer the device shown in the drawings, which consists of a threaded stem, $a$, attached to or forming part of the platform, a guiding-bracket, D, secured to a table or a bench, E, and a nut, G, which is within easy reach of the operator, who is seated at the table. The threaded stem is arranged to slide freely in the guides $d\ d$ on the bracket D, and is prevented from turning therein by a set-screw, $f$, the end of which enters a vertical slot, $t$, in the threaded stem; or a suitable key adapted to the said slot and fitted to a slot in one of the guides may be used in place of the screw. The nut G is confined vertically between the two guides $d\ d$ of the bracket, and is provided with an annular flange, $h$, preferably serrated at the edge, so that it can be conveniently manipulated. Other devices for raising and lowering the platform will readily suggest themselves to an expert mechanic; but whatever adjusting appliances are adopted they must be such that the upper surface of the platform will always be in a horizontal plane, no matter to what position it may be adjusted.

H is the sighting-bar, made perfectly true, and so secured to a stand, I, attached to the top of the table E, that its upper surface shall be in a horizontal plane. In Figs. 1 and 3 the sighting-bar is provided with a diamond, $x$, the cutting-point of which is in line with the said upper surface of the bar; but in Fig. 6 a cutting-wheel, $m$, referred to hereinafter, takes the place of a diamond.

Heretofore it has been the practice to determine the graduation-marks of measuring-vessels by the level of carefully-weighed quantities of water or other liquid introduced into said vessel, and the same guide is adopted in the present instance, but in connection with appliances by which the different graduations can be determined by observation of different levels of water in a glass, which always rests on the same horizontal platform throughout all its markings.

The sighting-bar H is at such an elevation that the eye of the operator seated at the table shall be in line, or very nearly so, with the upper surface of the said bar, so that after a given quantity of water has been introduced into the vessel the operator can, by manipulating the nut G, adjust the platform and vessel until by observation he finds that the level of the water in the vessel is in the same plane as the upper surface of the sighting-bar, after which he releases the nut and gently pushes the vessel against the diamond, so that a slight scratch will be made on the said vessel, and these operations are continued until scratches indicating the proper position of all the desired graduations as determined by different quantities of water introduced into the vessel have been made thereon.

Any mineral or other substance capable of scratching glass may be substituted for a diamond; but the latter is preferred.

It should be understood that when a diamond is used the marks made are simple scratches, and not the final graduations, which are made by separate appliances, the scratches simply serving as guides in making the final marks.

It may be stated here that water in a vessel is not of a uniform level, the water being higher at and near the side than in the middle. Sometimes the graduation-lines are made to coincide with the water-line at the side of the vessel, and sometimes with the general water-level, and sometimes two lines are made, one for indicating the height of the water at the side of the vessel, the other indicating the general level. Scratches indicating the proper position for any of these lines can be accurately made by the aid of the above-described appliances.

I prefer the plan shown in Figs. 4 and 5 of making the diamond-mounted sighting-bar. A recess, $w$, is made in the top of the bar, and into this recess is snugly fitted and secured a block, $p$, which is thicker than the said recess is deep, so that the block will extend a short distance above the bar, an arrangement by which I am enabled to insert into the end of the block a small diamond, $x$, the cutting-point of which shall be in line with the upper surface of the said bar.

If in making this device the cutting-point of the diamond should in the first instance be a little too low or a little too high it may be adjusted to the proper altitude, so as to be in line with the upper surface of the sighting-bar, by reducing the under side of the block $p$ if the diamond be too high, or by packing-pieces if the diamond is too low.

The cutting-point of the diamond may be above the surface of the sighting-bar when the graduations have to coincide with the water at its highest point—that is, at the sides of the vessel—the sighting being done by the observation of the general level of the water in connection with the sighting-bar.

The block $p$ will not interfere with proper sighting by the operator, whose eye may be directed to that portion of the upper surface of the sighting-bar which is near one edge of the same, as indicated by the arrow in Fig. 3.

The final graduations may be made at once on the vessel by substituting for the diamond an engraving-wheel, as shown in Fig. 6, the wheel being in a horizontal plane, and having journals adapted to bearings on a bracket, H', adjustably secured to a stand, F, and the spindle of the wheel being provided with a pulley, $n$, for receiving a driving-band from a pulley on any neighboring shaft. The sighting-bar H is retained in this modification, but has no block $p$ or diamond. The cutting-edge of the wheel bears such a relation to the upper surface of the sighting-bar that, if the vessel be brought in contact with the cutting-edge of the wheel after proper sighting by the aid of the bar and the surface of the water in the vessel, the line made on the latter by the wheel will be an accurate graduation, and all the graduations made on the vessel in the same manner must be parallel with each other. The lines are made by turning the glass while it rests on the platform and while it is in contact with the cutting-wheel. I, however, prefer the use of a diamond for making preliminary scratches on the vessel, and to rely upon separate apparatus for making the final graduations.

I claim as my invention—

1. The combination of a platform, A, and devices for the vertical adjustment of the same, with a sighting-bar and with a glass cutting or engraving tool, substantially as described.

2. The combination of a sighting-bar, having a diamond or other glass-cutter, with the platform A, its threaded stem $a$, guides therefor, and a nut for the vertical adjustment of the stem and platform, substantially as specified.

3. The within-described diamond-mounted sighting-bar, the same consisting of the bar H, having a recess, $w$, and a block, $p$, fitted into the said recess, and carrying at its end a diamond, $x$, all being combined substantially as described.

In testimony whereof I have signed my name to this specification in the presence of two subscribing witnesses.

RICHARD M. ATWATER.

Witnesses:
 HENRY HOWSON, Jr.,
 THOMAS DUGAN.